Aug. 18, 1931.  A. A. STONE  1,819,660
BROILING DEVICE
Filed Jan. 2, 1931

INVENTOR
Arthur A. Stone
BY
Brockett, Hyde, Higley & Meyer
ATTORNEYS

Patented Aug. 18, 1931

1,819,660

UNITED STATES PATENT OFFICE

ARTHUR A. STONE, OF CLEVELAND, OHIO, ASSIGNOR TO PEARL F. STONE, OF CLEVELAND HEIGHTS, OHIO

BROILING DEVICE

Application filed January 2, 1931. Serial No. 506,066.

This invention relates to an improved broiling device for use in the broiling ovens of gas stoves and the like, said device comprising a generally rectangular drip pan adapted to be supported in generally horizontal position in the broiling oven of a stove beneath the burner or burners thereof and a generally rectangular, perforated plate upon which is supported the food to be broiled, said plate being adapted to be supported upon the drip pan, as will hereinafter more fully appear.

Both the drip pan and the food supporting plate are simple one-piece sheet metal members so that they can be easily and inexpensively formed and quickly and conveniently cleaned. The food supporting plate has its food supporting portion sufficiently perforated to prevent the accumulation and burning thereon of the grease of the food being broiled, said grease passing freely through said perforations down into the drip pan, where it is collected for later use. There is no sputtering and no burning of the grease so that the broiling oven remains in a clean condition.

Further and more specific objects of the invention are in part obvious and in part will appear more in detail hereinafter.

Figure 1:
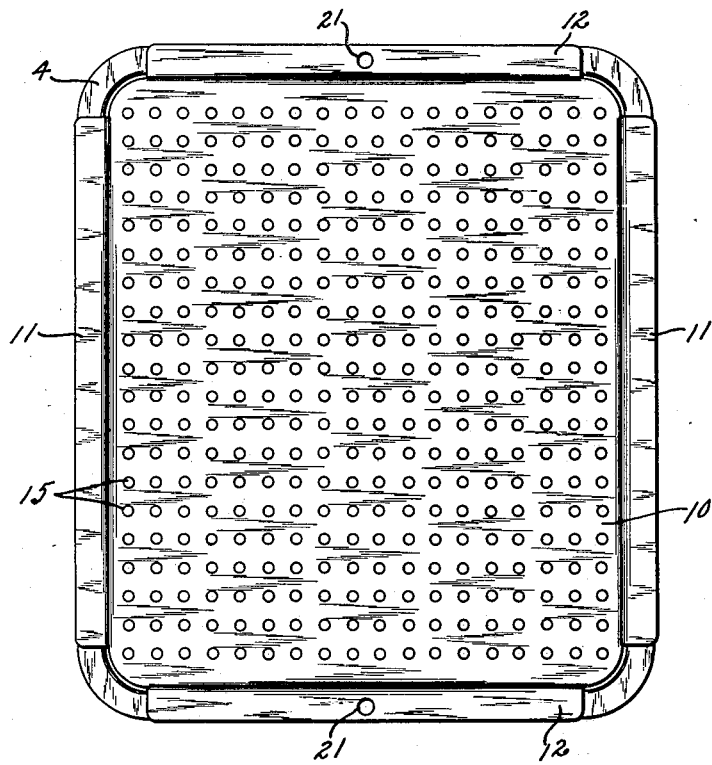
Figure 2:
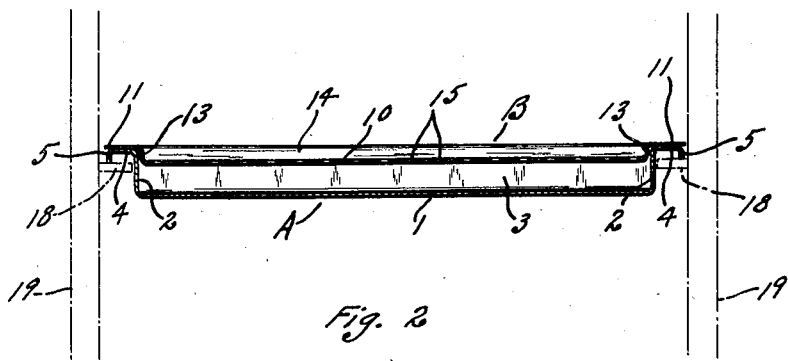

The invention will be readily understood from the following description thereof, reference being had to the accompanying drawings in which Fig. 1 is a top plan view of the present improved broiling device; and Fig. 2 is a vertical sectional view thereof, the supporting side walls of the broiling oven of a gas stove or the like being shown in dash-dot lines.

The present improved broiling device comprises two simply and inexpensively formed, one-piece sheet metal members, namely, a drip pan member A and a plate member B upon which the food to be broiled is supported.

Said drip pan member is of generally rectangular shape and of the usual pan form, comprising a generally rectangular bottom 1, two upright side walls 2, two upright end walls 3, and an uninterrupted top wall 4 extending directly outwardly from the upper edges of the side and end walls and terminating, in the present embodiment of the invention, in a short depending flange 5.

The food supporting plate member B is also of generally rectangular shape and includes a correspondingly shaped supporting portion 10 for the food to be broiled and two pairs of outwardly extending flanges 11 and 12, by means of which flanges said plate member is supported. The two flanges 11 are side flanges and the two flanges 12 are end flanges, and while said two pairs of flanges may lie in the horizontal plane of the food supporting portion 10, they lie, in the preferred embodiment of the invention here shown, in a horizontal plane offset or spaced upwardly from the plane of said food supporting portion. To accomplish this, the present plate member is provided at each of the two side edges of its food supporting portion 10 with an upright wall portion 13, from the upper edges of which wall portions outwardly extend the supporting flanges 11. Likewise, the plate member is provided at each of the two end edges of its food supporting portion with an upright wall portion 14, from the upper edges of which outwardly extend the supporting flanges 12.

The outwardly extending supporting flanges 11 and 12 of the plate member B are adapted to rest upon the correspondingly extending top wall 4 of the pan member A and thus enable said plate member to be supported upon said pan member, with the food supporting portion 10 of said plate member spaced above the bottom 1 of said pan member, all as clearly shown in Fig. 2.

The food supporting portion 10 of the plate member B is provided throughout its entire area with perforations 15 which permit grease dripping or freed from the food being broiled to readily pass down through said plate portion into the pan member A arranged therebelow. The perforations 15 are of such number and/or of such size that no unperforated areas are provided of sufficiently large size to permit grease to collect thereon. Therefore, burning on the food supporting plate portion 10 of grease freed from the food being broiled, and burning of the food itself, are thus effectively prevented. Moreover, there is no smoke and no sputtering of the grease in the oven so that the oven remains in a clean condition.

In the embodiment of the invention here shown, the perforations 15 are small round holes spaced about one-half inch apart, as clearly indicated in Fig. 1.

The side walls of the broiling ovens of gas stoves and the like are usually provided at various heights with pairs of inwardly extending shelves or ledges, such as the shelves or ledges 18 of the oven side walls 19, Fig. 2, upon which shelves or ledges the present broiling device may be directly supported, as in Fig. 2, or upon which shelves or ledges may be supported a separate member (not shown) which in turn supports the broiling device, all as will be readily understood.

While the present food supporting plate member B may be provided with but one pair of supporting flanges, a stronger structure is provided if said plate member has two pairs of supporting flanges, namely, a pair of end flanges 12 and a pair of side flanges 11, as shown.

To enable the present broiling device to be suspended on a hook or nail when not in use, suitable apertures are provided in either or both ends of the device. As here shown, each end flange 12 of the food supporting plate member is provided with an aperture 21 and similar apertures are provided in the end portions of the top wall 4 of the drip pan member A.

It will, of course, be appreciated that many changes may be made in the present broiling device without departing from either the scope or the spirit of the present invention.

What I claim is:

1. A broiling device, comprising a relatively shallow drip pan member and a sheet metal food-supporting plate member supported thereon at substantially the top thereof, said food-supporting member having a flat, food-supporting portion entirely covering the chamber of said drip pan member and provided throughout substantially its entire area with perforations, said perforations being of such size and being so spaced as to permit grease freed from the food being broiled to readily and quickly pass therethrough down into the chamber of the drip pan member but effectively preventing burning of said grease within said drip pan chamber.

2. A broiling device, comprising a relatively shallow drip pan member and a food-supporting plate member supported thereon at substantially the top thereof, said food-supporting member having a generally flat, food-supporting portion entirely covering the chamber of said drip pan member and provided throughout substantially its entire area with perforations, said perforations being of such size and being so spaced as to permit grease freed from the food being broiled to readily and quickly pass therethrough down into the chamber of the drip pan member but effectively preventing burning of said grease within said drip pan chamber.

In testimony whereof I hereby affix my signature.

ARTHUR A. STONE.